(12) United States Patent
Burns et al.

(10) Patent No.: US 12,341,846 B2
(45) Date of Patent: *Jun. 24, 2025

(54) EFFICIENT SIMILARITY DETECTION

(71) Applicant: AWES.ME, INC., Mountain View, CA (US)

(72) Inventors: Gabrielle Burns, Santa Clara, CA (US); Yuping He, San Jose, CA (US)

(73) Assignee: AWES.ME, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,735

(22) Filed: Sep. 29, 2023

(65) Prior Publication Data

US 2024/0020270 A1  Jan. 18, 2024

Related U.S. Application Data (63) Continuation of application No. 17/035,195, filed on Sep. 28, 2020, now Pat. No. 11,868,311, which is a
(Continued)

(51) Int. Cl.
*G06F 16/10* (2019.01)
*G06F 16/13* (2019.01)
(Continued)

(52) U.S. Cl.
CPC ............ *H04L 67/10* (2013.01); *G06F 16/137* (2019.01); *G06F 16/152* (2019.01);
(Continued)

(58) Field of Classification Search
None
See application file for complete search history.

(56) References Cited

U.S. PATENT DOCUMENTS 6,049,799 A * 4/2000 Mangat ............... G06F 16/9024
8,014,634 B1   9/2011 Chan
(Continued)

FOREIGN PATENT DOCUMENTS

WO   WO 2018/148120   8/2018

OTHER PUBLICATIONS

PCT Application No. PCTUS2018016772 International Search Report and Written Opinion dated Jul. 3, 2018; 12 pages.
(Continued)

*Primary Examiner* — Jau Shya Meng
(74) *Attorney, Agent, or Firm* — Polsinelli LLP (57) ABSTRACT

Embodiments disclosed herein generally relate to a method for uploading a file to a server. The server receives a request from a user to upload a file thereto. An upload client extracts file information from the file. The server generates a file signature for the file. The server accesses one or more existing file signatures for each of one or more existing files on the server. The server determines whether any of the one or more existing file signatures are similar to the file signature. Responsive to determining that there is an existing file signature that is similar to the file signature, the server accesses a first hash signature for the existing file. The upload client generates a second hash signature for the file. Responsive to determining that the first hash signature does not equal the second hash signature, the upload client uploads the file to the server.

21 Claims, 7 Drawing Sheets

Related U.S. Application Data continuation of application No. 15/876,652, filed on Jan. 22, 2018, now Pat. No. 10,803,013.

(60) Provisional application No. 62/539,963, filed on Aug. 1, 2017, provisional application No. 62/457,724, filed on Feb. 10, 2017.

(51) Int. Cl.
| | | |
|---|---|---|
| *G06F 16/14* | (2019.01) | |
| *G06F 16/16* | (2019.01) | |
| *G06F 16/182* | (2019.01) | |
| *G06F 16/28* | (2019.01) | |
| *G06F 16/93* | (2019.01) | |
| *H04L 67/01* | (2022.01) | |
| *H04L 67/06* | (2022.01) | |
| *H04L 67/10* | (2022.01) | |
| *H04L 67/1097* | (2022.01) | |

(52) U.S. Cl.
CPC .......... *G06F 16/168* (2019.01); *G06F 16/183* (2019.01); *G06F 16/285* (2019.01); *G06F 16/93* (2019.01); *H04L 67/01* (2022.05); *H04L 67/06* (2013.01); *H04L 67/1097* (2013.01)

(56) References Cited

U.S. PATENT DOCUMENTS

| | | | |
|---|---|---|---|
| 8,375,124 B1 * | 2/2013 | Schwartz | H04L 69/28 709/224 |
| 8,904,120 B1 | 12/2014 | Killamsetti et al. | |
| 9,594,678 B1 | 3/2017 | Karr et al. | |
| 10,803,013 B2 | 10/2020 | Burns et al. | |
| 10,909,304 B2 * | 2/2021 | Fitzpatrick | G06F 40/143 |
| 11,868,311 B2 | 1/2024 | Burns et al. | |
| 2001/0037454 A1 | 11/2001 | Botti et al. | |
| 2002/0032489 A1 | 3/2002 | Tynan et al. | |
| 2003/0177118 A1 | 9/2003 | Moon et al. | |
| 2004/0054906 A1 | 3/2004 | Carro | |
| 2008/0065606 A1 * | 3/2008 | Boys | G06F 16/951 |
| 2009/0037967 A1 | 2/2009 | Barkan et al. | |
| 2009/0327277 A1 | 12/2009 | Sanborn et al. | |
| 2010/0124235 A1 * | 5/2010 | Walsh | H04L 63/10 370/449 |
| 2010/0250480 A1 | 9/2010 | Cherkasova et al. | |
| 2011/0219300 A1 | 9/2011 | Jindal et al. | |
| 2012/0054658 A1 | 3/2012 | Chuat et al. | |
| 2013/0275429 A1 | 10/2013 | York et al. | |
| 2014/0089273 A1 | 3/2014 | Borshack et al. | |
| 2014/0270536 A1 | 9/2014 | Amtrup et al. | |
| 2014/0344739 A1 | 11/2014 | Yoon | |
| 2015/0036919 A1 | 2/2015 | Bourdev et al. | |
| 2015/0127607 A1 | 5/2015 | Savage et al. | |
| 2015/0154229 A1 * | 6/2015 | An | G06F 16/583 707/756 |
| 2016/0134667 A1 | 5/2016 | Suresh et al. | |
| 2016/0253350 A1 | 9/2016 | Moulik et al. | |
| 2017/0171294 A1 * | 6/2017 | Kennedy | G06F 16/951 |
| 2017/0193329 A1 | 7/2017 | Suman | |
| 2018/0060356 A1 * | 3/2018 | Watanabe | G06F 16/5838 |
| 2018/0232388 A1 | 8/2018 | Burns et al. | |
| 2021/0011883 A1 | 1/2021 | Burns et al. | |
| 2024/0020270 A1 | 1/2024 | Burns et al. | |

OTHER PUBLICATIONS

U.S. Appl. No. 15/876,652, Office Action mailed Feb. 7, 2020.
U.S. Appl. No. 17/035,195, Office Action mailed Aug. 26, 2022.
U.S. Appl. No. 17/035,195, Final Office Action mailed Mar. 20, 2023.

* cited by examiner

EFFICIENT SIMILARITY DETECTION

CROSS-REFERENCE TO RELATED APPLICATIONS

The present patent application is a continuation and claims the priority benefit of U.S. patent application Ser. No. 17/035,195 filed Sep. 28, 2020, which is a continuation and claims the priority benefit of U.S. patent application Ser. No. 15/876,652, filed Jan. 22, 2018, now U.S. Pat. No. 10,803, 013, which claims benefit to U.S. provisional application 62/539,963, filed Aug. 1, 2017, and to U.S. provisional application 62/457,724, filed Feb. 10, 2017, the disclosures of which are incorporated herein by reference.

BACKGROUND OF THE INVENTION

Field of the Invention

Embodiments of the present disclosure generally relate to a system and method for uploading a file to a file storage location from multiple devices.

Description of the Related Art

The production and availability of information and media has gained prevalence in today's society. The ability to instantly access and share information, experiences, news, photos, and videos over the internet and on mobile devices has revolutionized the way people connect, learn, consume information, and participate in today's society.

In recent years, the popularity of business and personal web pages that are hosted by web service providers has increased. Examples of such web pages include profile pages on social network websites, blog web pages, online photo galleries, and the like. There exists a strong connection between a user and their web pages that has lead web page service providers to enable their customers to customize the look and feel of their web pages. For example, some web service providers allow web page users to upload photos that are displayed on their personal web pages, and/or allow web page users to edit the font size and typeface displayed on their web pages. Many web service providers further enable web page users to create a shareable photo gallery online. One popular approach to creating or adding photos to web pages is allowing the user to upload files or images stored on the device from which they are currently accessing the web page.

As a user continues to upload and edit one or more media files in his or her accounts, there is a tendency for the user's online gallery to become disorganized and fragmented. For example, the user may access a photo in a gallery on the account for local editing. The user may edit the photo (e.g., color correction, red eye correction, and the like), and then subsequently re-upload the file to his or her account. Unfortunately, re-uploading the media file may present one or more conflicts.

As the foregoing illustrates, there is a need for improved techniques for uploading one or more media files to the server. More specifically, what is needed in the art is an improved method of detecting similar media files.

SUMMARY OF THE CLAIMED INVENTION

Embodiments disclosed herein generally relate to a method, system, and computer readable medium for uploading a file to a server. The server receives a request from a user to upload a file thereto. An upload client extracts file information comprising at least a filename, a file size, and metadata from the file. The server generates a file signature for the file based on at least the filename, file size, and metadata. The server accesses one or more existing file signatures for each of one or more existing files on the server. The server determines whether any of the one or more existing file signatures are similar to the file signature. Responsive to determining that there is an existing file signature that is similar to the file signature, the server accesses a first hash signature for the existing file corresponding to the existing file signature. The upload client generates a second hash signature for the file corresponding to the file signature. Responsive to determining that the first hash signature does not equal the second hash signature, the upload client uploads the file to the server.

In one embodiment, a method, system, and computer readable medium for categorizing one or more files is disclosed herein. The server receives a curation request. A curation assistant accesses one or more files associated with a user account. The curation assistant identifies each of the one or more uncategorized files not categorized into a gallery. The curation assistant extracts one or more signatures from a first uncategorized file. The curation assistant determines whether a signature from the one or more signatures of the first uncategorized file is similar to at least one categorized signature from the one or more files. Responsive to determining that at least one categorized signature matches the signature from the first uncategorized file, the curation assistant presents to a user the uncategorized file corresponding to the signature and the file corresponding to the at least one categorized signature. The curation assistant categorizes the uncategorized file in accordance with instructions received from the user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments disclosed herein generally relate to a method for uploading a file to a server. The server receives a request from a user to upload a file thereto. An upload client extracts file information from the file. The server generates a file signature for the file. The server accesses one or more existing file signatures for each of one or more existing files on the server. The server determines whether any of the one or more existing file signatures are similar to the file signature. Responsive to determining that there is an existing file signature that is similar to the file signature, the server accesses a first hash signature for the existing file. The upload client generates a second hash signature for the file. Responsive to determining that the first hash signature does not equal the second hash signature, the upload client uploads the file to the server.

The term "user" as used herein includes, for example, a person or entity that owns a computing device or wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "media item" as used herein includes, for example, computer files, data, images, photos, documents, other such electronic media, and other resources for storing information, which is available to a computer program and which may be based on some type of durable storage. A file is durable in that it generally remains available for other programs or applications to use after the program or application that created it has finished executing.

Figure 1:
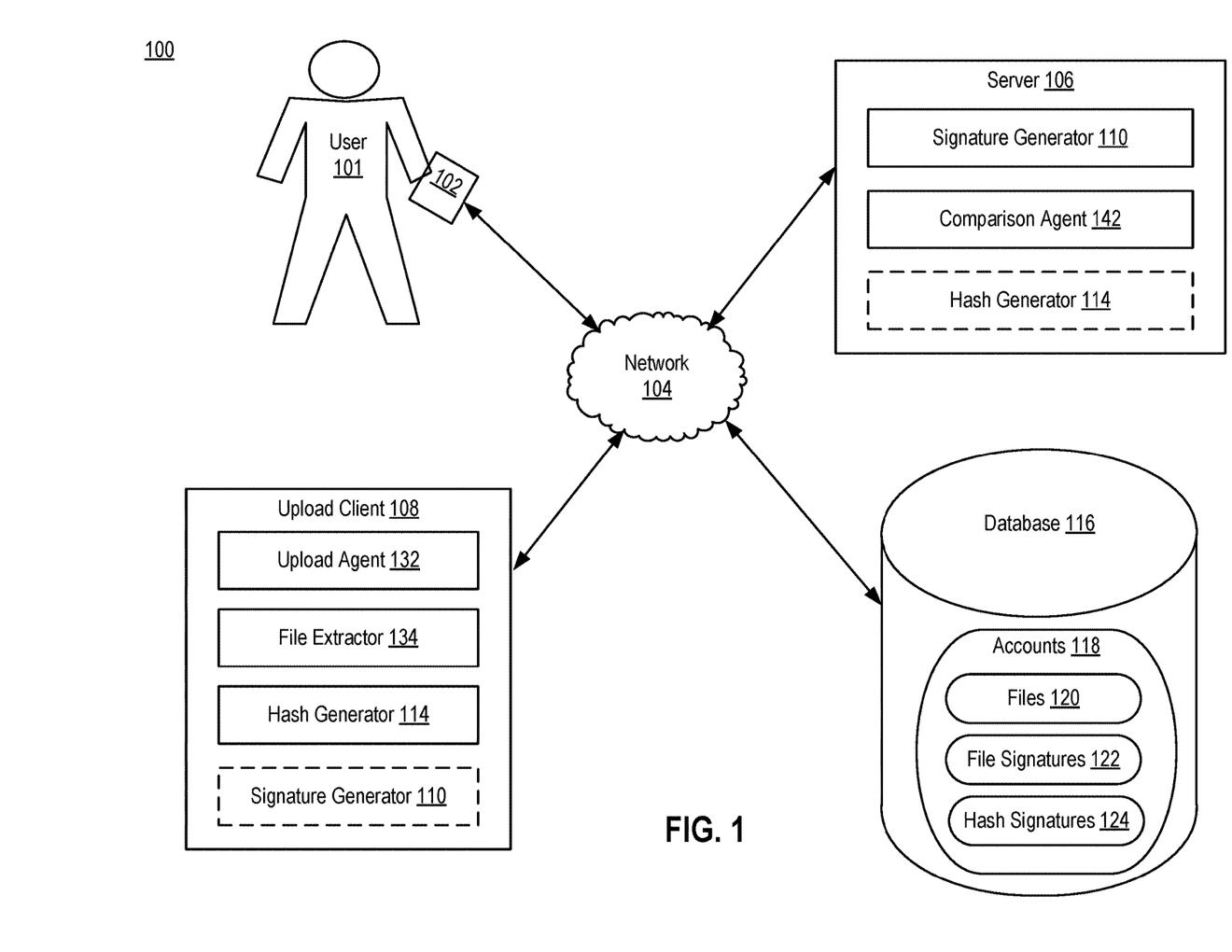
FIG. 1 illustrates a computing environment, according to one embodiment.

FIG. 1 illustrates a computing environment 100, according to one embodiment. The computing environment 100 includes a client device 102, an upload client 108, and a server 106. The client device 102, the upload client 108, and the server 106 communicate over network 104. The client device 102 may be any type of computing device accessible by a user 101, such as, but not limited to, a computer, a mobile device, a tablet, and the like. The server 106 is in communication with a database 116 through a network 104. For example, the server 106 may communicate with the database 116 via a local connection (e.g., Storage Area Network (SAN) or Network Attached Storage (NAS)) or over the Internet (e.g., a cloud based storage service). The server 106 is configured to either directly access data included in the database 116 or to interface with a database manager (not shown) that is configured to manage data included within the database 116.

User 101 may be associated with one or more accounts 118 stored in database 116. For example, as depicted, user 101 is associated with account 118 stored in database 116. In some embodiments, user 101 may be associated with more than one account 118. Generally, each user may be associated with one or more accounts stored in the database 116. The account 118 is a data object that stores data associated with user 101. For example, the account 118 may include information such as the user's 101 email address, password, contact information, billing information, and the like. The account 118 may also include one or more media files 120.

User 101 may access the account 118 through the client device 102 by communicating with the server 106. For example, the user 101 may communicate with the server 106 via a web browser on the client device 102 or an application installed on the client device 102. The user 101 accesses one or more media files 120 stored in the database 116 via the network 104 which, in turn, retrieves the online media files 120 from the database 116 and causes the media files to be displayed through a graphical user interface (GUI) of the user's client device 102. For example, the user 101 may access a digital photograph in an online photo gallery. In this example, the user 101 communicates with the server 106 over the network 104 to retrieve and present a digital photograph from database 116.

As shown, the client device 102 communicates with the upload client 108 to upload one or more media files to the user's account 118. In one embodiment, the upload client 108 may be an application or program run on the client device 102. In another embodiment, the upload client 108 may be an application installed on server 106 and accessible to the client via a web browser or application. The upload client 108 may be accessible when a user is logged into his or her account 118 and chooses to upload files into a new or existing gallery. The upload client 108 enables the user 101 to select one or more media files 120 that are locally available to the client device 102 on which the application is executing for upload according to a variety of techniques.

As a user continues to upload and edit one or more media files in his or her accounts, there is a tendency for the user's online gallery to become disorganized and fragmented. For example, the user may access a photo in a gallery on the account for local editing. The user may edit the photo (e.g., color correction, red eye correction, and the like), and then subsequently re-upload the file to his or her account. Unfortunately, re-uploading the media file may present one or more conflicts. For example, re-uploading the media file may present filename conflicts, especially when the user does not rename the adjusted media file. Filename conflicts may require the user to rename each of the conflicting media files. In another example, re-uploading the media file may present a similar media file conflict. The similar media file conflict is present when a media file is uploaded and the media file is similar to one or more media files already present in the user's account. For example, a similar media file conflict may be present in the above example with an original media file and a re-touched (or edited) media file. In the case where both media files have different filenames, a filename conflict does not occur; however, a similar media file conflict is present. The similar media file conflict may be determined based on, for example, a pixel analysis, a filename analysis, or the like.

The upload client 108 aids in handling similar file uploads. For example, when the user 101 attempts to upload a media file to his or her account 118, the upload client 108 determines whether the media file is similar to one or more media files 120 of the client's account 118 in the database 116. The upload client 108 includes a file extractor 134 and a hash generator 114. The file extractor 134 is configured to extract basic file information as well as any metadata stored within the file for each of the media files that have been selected for uploading. For example, the file extractor 134 is configured to extract file information in the form of filename (e.g., IMG_0001.jpg) and file size (e.g., 15 kB). Most media files maintain a set of metadata about the media file that are not part of the media file's actual contents. For example, metadata may include, but is not limited to, information such as the media file's creation time, modification time, software used to create or modify the file, take the image was captured, camera make and model, and the like. The metadata could be embedded within the file using standards such as exchangeable image file format (EXIF), International Press Telecommunications Council (IPTC), or any suitable standard. The hash generator 114 is configured to generate a hash value for the media file. The generated hash value can be compared against preexisting hashes of media files 120 in database 116 to determine if the uploaded media file is a similar file. However, because the calculation of hash values can be expensive and time consuming, the hash generator 114 is configured to generate the hash value when prompted. For example, the hash generator 114 may generate the hash value for the uploaded media file when prompted by the server 106.

The upload client 108 may transfer the file information and metadata to the server 106. The server 106 includes at least a signature generator 110 and a comparison agent 142. The signature generator 110 is configured to generate first a signature for the media file to be uploaded. For example, the signature generator 110 generates a first signature for the media file based on the received basic file information and metadata received from upload client 108. The comparison agent 142 is configured to compare the generated first signature to one or more file signatures 122 stored in database 116.

Generally, the database 116 may include one or more accounts 118. Each account 118 may include one or more media files 120 and one or more file signatures 122. The one or more media files 120 are media files that the user previously uploaded. For example, the one or more media files 120 are those media files against which the media file to be uploaded will be compared. The file signatures 122 are first signatures that have been generated for each media file 120. For example, each file signature 122 corresponds to a given media file 120.

Referring back to the comparison agent 142, when the comparison agent compares the generated first signature of the media file to be uploaded, the comparison agent 142 compares the first signature generated by the signature generator 110 to each of the file signatures 122 stored in database 116 associated with the user's account 118. The comparison agent 142 compiles a list of file signatures 122 that are identified as a positive match. For example, the comparison agent 142 may compile a list of file signatures 122 that are similar, identical, or within some predetermined deviation from the signature generated by signature generator 110. Because the first signature (i.e., the signature generated based on basic file information and file metadata) has a tendency to result in a false-positive match, the first signature is used as a "filtering" signature to provide the upload client 108 with a list of media files 120 that may be potential matches.

Each account 118 may further include one or more hash signatures 124. Each of the one or more hash signatures 124 corresponds to each of the one or more media files 120. Each hash signature 124 is a unique signature that is generated for each media file 120. Each hash signature 124 stored in database 116 is a predetermined hash file. The comparison agent 142 compiles a list of hash signatures 124 corresponding to each media file in the compiled list of file signatures 122 that are similar, identical, or within some predetermined deviation from the signature generated by the signature generator 110. The comparison agent 142 then transfers the compiled list of hash signatures 124 to the upload client 108 for further analysis.

The upload client 108 may further include a hash generator 114. The hash generator 114 is configured to generate a hash signature for the media file to be uploaded. The upload agent 132 then compares the generated hash signature of the media file to be uploaded to each of the hash signatures 124 in the compile list of hash signatures. The upload agent 132 then determines if generated hash signature is similar, identical, or within some predetermined deviation from one of the hash signatures 124. Upon determining that the generated hash signature of the media file matches one of the hash signatures 124 in the compiled list, in one embodiment, the upload agent 132 may prompt the user to take action. For example, the upload agent 132 may prompt the user to select if the user wants to "skip upload," "upload new version," "upload new file," "replace," or "skip uploading." In another embodiment, the user may pre-select which action to take by clicking one or more boxes when submitting the media file for upload. In this way, the user may select multiple media files for upload at the outset, along with the user's upload preferences, so that the upload agent 132 may carry out the upload process without additional feedback from the user.

Figure 2:
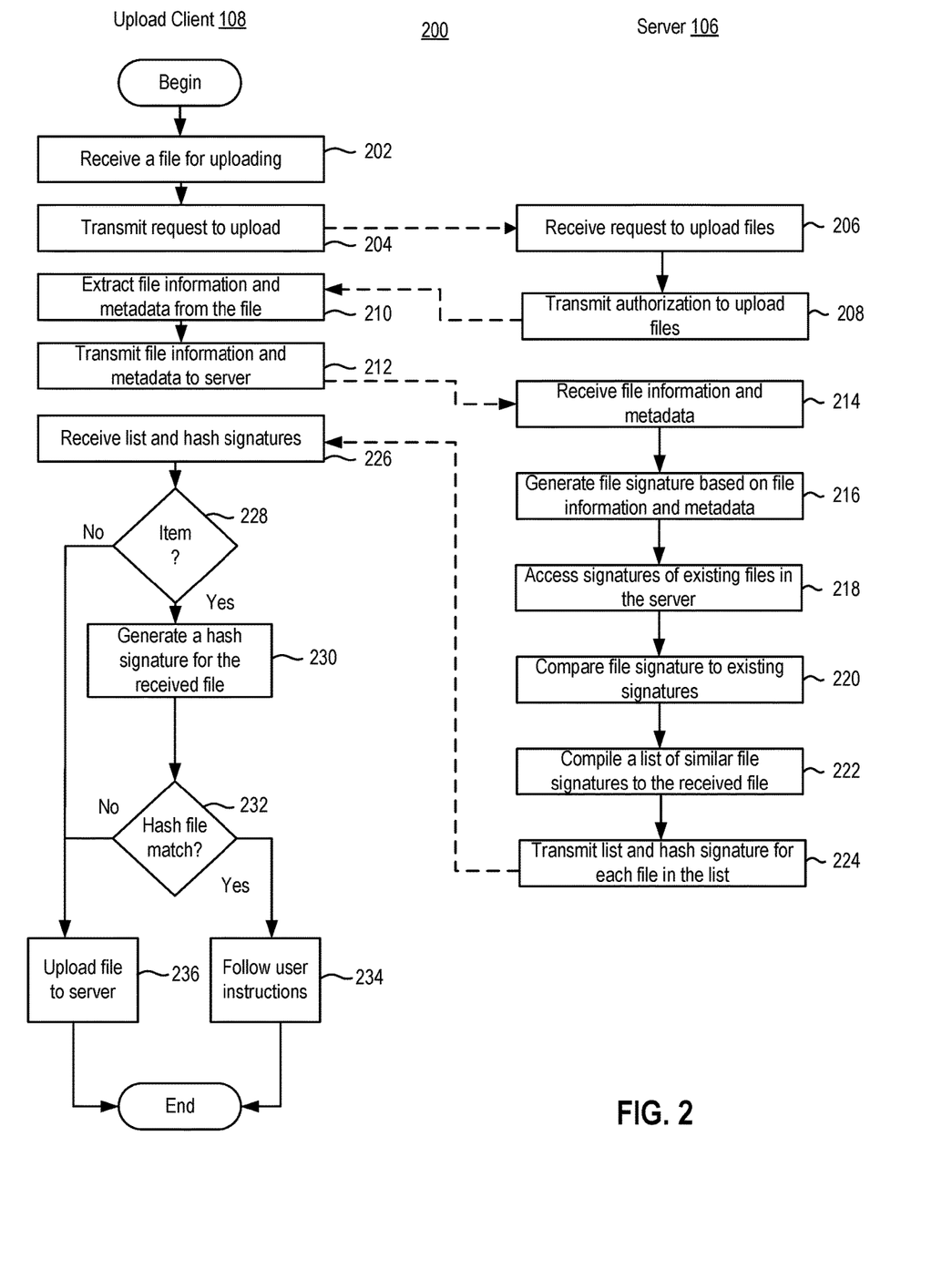
FIG. 2 is a flow diagram illustrating a method of uploading a media file to a file server, according to one embodiment.

FIG. 2 is a flow diagram illustrating a method 200 of uploading a media file to a file server, according to one embodiment. The method 200 begins at operation 202. At operation 202, the upload client receives one or more files for uploading. For example, the user 101 may select one or more pre-existing media files on his or her client device 102 (e.g., mobile device) for upload. For this discussion, assume that the client selects one media file for upload. The upload client 108 transmits a request to upload the media file to the server 106 (operation 204). At operation 206, the server 106 receives the upload request from the user. The server 106 transmits authorization to upload the media file to the upload client 108 (operation 208).

After the upload client 108 receives authorization to upload the media file, the upload client 108 extracts file information and metadata from the file (operation 210). For example, the file extractor 134 in upload client 108 is configured to extract basic file information as well as any metadata stored within the media file selected for uploading. At operation 212, the upload client 108 transmits the file information and the metadata for the media file to the server 106 for analysis.

At operation 214, the server 106 receives the file information and metadata for the media file from the upload client 108. The server 106 then generates a file signature for the media file (operation 216). For example, the signature generator 110 may generate the file signature for the media file based on the received file information and metadata received from the upload client 108. In one embodiment, the file signature may comprise both a basic signature and a metadata signature. The basic signature is generated based on the extracted file information. The metadata signature is generated based on the received metadata. When combining the metadata signature with the basic signature, the overall file signature can be generated, which significantly improves the accuracy with which the upload client can identify similar files, compared to using solely the basic signature or the metadata signature.

At operation 218, the server 106 accesses the file signatures 122 stored in database 116. For example, the server 106 accesses the files signatures 122 associated with user's account 118. Each file signature 122 in database 116 corresponds to a given media file 120 stored in account 118. The file signatures 122 may be generated and stored during upload of each respective media file 120. In other embodiments, the file signatures 122 may be generated at a time after upload. The server 106 then compares each file signature 122 in account 118 (operation 220). For example, comparison agent 142 accesses the file signatures 122 associated with user's account 118 and compares each file signature 122 to the generated file signature to determine if there are any identical or similar media files 120 already uploaded to database 116.

At operation 222, the server 106 compiles a list of similar file signatures to the received media file. For example, the comparison agent 142 determines those file signatures 122 in account 118 that are identical or similar to the file signature of the media file. Each item in the list of file signatures has a unique mapping to a media file 120 stored in the database 116. As such, the file signature 122 can be mapped back to its respective media file 120 for inspection, if need be.

At operation 224, the server 106 transmits the list of file signatures 122 and a hash signature for each media file represented in the list of file signatures 122 to the upload client 108. Each hash signature 124 is a unique signature that is generated for each media file 120. Each hash signature 124 stored in database 116 is a predetermined hash file. For example, the hash signature 124 for a given media file 120 may have been generated or uploaded when its respective media file 120 was uploaded.

The upload client 108 receives list of file signatures 122 and the hash signatures from the server 106 (operation 226). The upload client 108 determines whether the list contains any items, i.e., existing media files (operation 228). If the list does not include an item, then at operation 236 the upload client 108 uploads the media file. The upload client 108 uploaded the media file because the upload client 108 determined that there are not any similar or identical files in user's account 118. If, however, there is an item in the list, the upload client generates a hash signature for the media file to be uploaded (operation 230). For example, the hash generator 114 generates a unique hash signature corresponding to the media file.

At operation 232, the upload client 108 compares the hash signature for the media file to the hash signatures transmitted by the server 106. If the upload client 108 determines that there is a match, the upload client 108 follows predefined user instructions (operation 234). For example, the upload client 108 may reject for upload, upload as a new version, upload as a replacement, or the like based on the user's account settings. In another embodiment, the upload client 108 may prompt the user 101 to make a decision as to how to upload the media file through a prompt on the graphical user interface (GUI). If the upload client 108 determines that there is not a match, then the upload client 108 determined that the media file is not identical or similar to any media file 120 in server 106, and, thus, the upload client 108 uploads the media file to the account 118 (operation 236). In this manner, more efficient storage of media files enabled which reduces the amount of storage utilized by the server 106 and provides for improved media file storage characteristics, such as faster parsing and retrieval of a specific media file.

Figure 3:
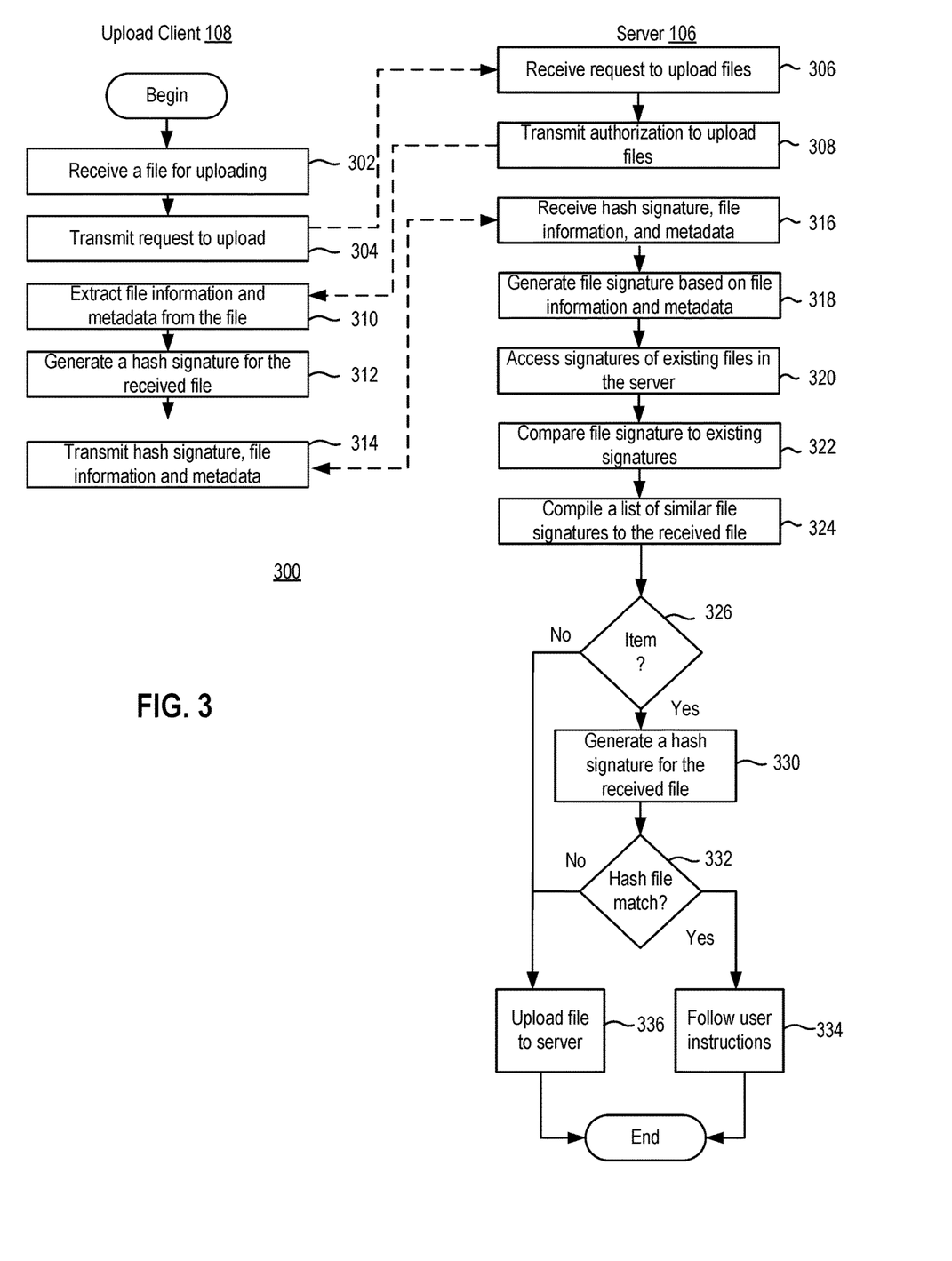
FIG. 3 is a flow diagram illustrating a method of uploading a media file to a file server, according to one embodiment.

FIG. 3 is a flow diagram illustrating a method 300 of detecting similar files during upload, according to one embodiment. In the embodiment discussed in FIG. 3 the server 106 includes the hash generator 114. As such, the generation of the hash signature for the received media file is performed on the server 106 rather than the upload client 108, as discussed in FIG. 2 above. Such transfer of hash generation duties may be beneficial in low powered client devices where generation of a hash may consume excessive power. Additionally, in the embodiment discussed in FIG. 3, the upload client 108 includes a signature generator 110. As such, the generation of the file signature for the received media file is performed on the upload client 108, rather than the server 106. Accordingly, all operations discussed above in conjunction with FIG. 2 or 3 may be performed solely on the server 106.

The method 300 begins at operation 302. At operation 302, the upload client 108 receives one or more files for uploading. For example, the user 101 may select one or more pre-existing media files on his or her client device 102 (e.g., mobile device) for upload. For this discussion, assume that the client selects one media file for upload. The upload client 108 transmits a request to upload the media file to the server 106 (operation 304). At operation 306, the server 106 receives the upload request from the user. The server 106 transmits authorization to upload the media file to the upload client 108 (operation 308).

After the upload client 108 receives authorization to upload the media file, the upload client 108 extracts file information and metadata from the file (operation 310). For example, the file extractor 134 in upload client 108 is configured to extract basic file information as well as any metadata stored within the media file selected for uploading. At operation 312, the upload client 108 then generates a file signature for the media file. For example, the signature generator 110 may generate the file signature for the media file based on the received file information and metadata received from the upload client 108. In one embodiment, the file signature may comprise both the basic signature and the metadata signature.

At operation 314, the upload client 108 transmits the hash signature and its respective media file to the server 106. The server 106 receives the hash signature and the media file from the upload client 108 (operation 316). After the server 106 receives the hash signature from the upload client 108, the server 106 generates a file signature based on the file information and metadata (operation 318). After the server 106 generates the file signature, the sever 106 accesses the file signatures 122 stored in database 116 (operation 320). For example, the server 106 accesses the files signatures 122 associated with user's 102 account 118. Each file signature 122 in database 116 corresponds to a given media file 120 stored in account 118. The file signatures 122 may be generated and stored during upload of each respective media file 120. In other embodiments, the file signatures 122 may be generated at a time after upload.

The server 106 then compares each file signature 122 in account 118 (operation 322). For example, comparison agent 142 accesses the file signatures 122 associated with user's account 118 and compares each file signature 122 to the generated file signature to determine if there are any identical or similar media files 120 already uploaded to database 116. Based on this comparison, the comparison agent 142 compiles a list of file signatures that are similar to the file signature of the media file to be uploaded (operation 324).

The server 106 determines whether the list contains any items, i.e., existing media files (operation 326). If the list does not include an item, then at operation 336 the server 106 transfers the media file from the client to the server 106. In one example, the server 106 saves or records the media file to a user's account because the server 106 determined that there are not any similar or identical files in user's account 118. If, however, there is an item in the list, the server 106 generates a hash signature for the media file to be uploaded (operation 330).

At operation 332, the comparison agent 142 compares the hash signature of the media file to be uploaded to the received hash signatures. If the comparison agent 142 determines that there is a match, then the server follows the predefined user instructions (operation 334). For example, the client server 106 may reject for upload, upload as a new version, upload as a replacement, or the like based on the user's account settings. In another embodiment, the server 106 may prompt the user 101 through the client device 102 to make a decision as to how to upload the media file through a prompt on the graphical user interface (GUI). If the server 106 determines that there is not a match, then the server 106 determined that the media file is not identical or similar to any media file 120 stored in server 106, and, thus, the server 106 uploads the media file to the account 118 (operation 336).

Figure 4:
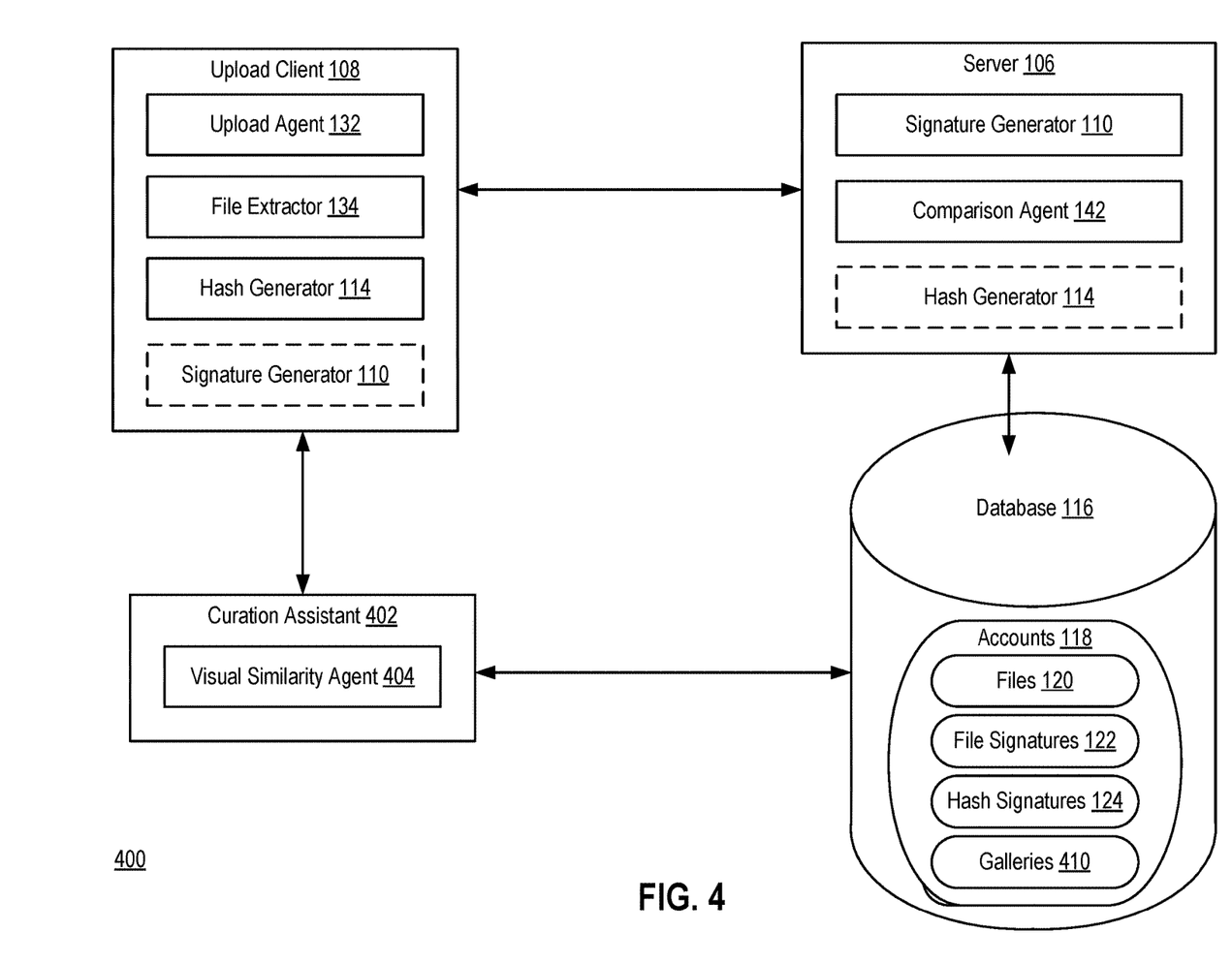
FIG. 4 illustrates a computing environment, according to one embodiment.

FIG. 4 illustrates a computing environment 400, according to one embodiment. The computing environment 400 is substantially similar to computing environment 100 discussed above in conjunction with FIG. 1. The computing environment 400 further includes a curation assistant 402. The curation assistant 402 is configured to aid the user 101 in organizing user's 101 media files 120 into one or more galleries 410, stored in database 116. For example, the curation assistant 402 may utilize the comparison techniques discussed above in conjunction with FIGS. 1-3 to determine if a file is sufficiently similar to a media file 120 in a given gallery 410. Additionally, the curation assistant 402 may also include a visual similarity agent 404. The visual similarity agent 404 is configured to aid in determining whether a file to be uploaded is similar to one or more existing media files 120 in server 106, as well as determining whether the media file should belong in a particular gallery 410.

Figure 5:
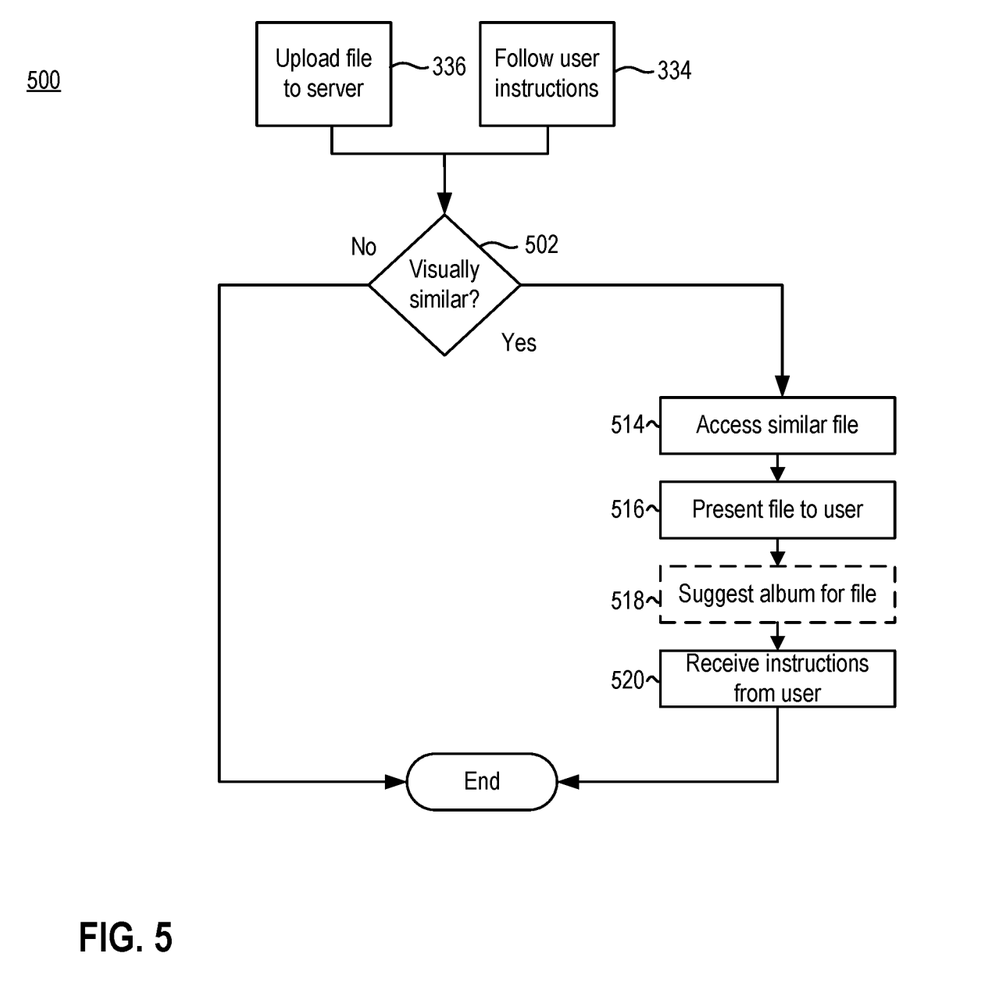
FIG. 5 is a flow diagram illustrating a method of uploading a media file to a file server, according to one embodiment.

FIG. 5 is a flow diagram illustrating a method 500 of uploading a media file, according to one embodiment. The method 500 is substantially similar to method 300, and begins after operations 334 and 336. At operation 336, the server 106 determines that there is not a match between the generated hash signature of the file to be uploaded and the hash signatures 124 stored in database 116. At operation 334, the server 106 determines that there was a match between the generated hash signature of the file to be uploaded and the hash signatures 124 stored in the database 116. At operation 502, the server 106 determines whether the media file to be uploaded is visually similar to a media file 120 in user account 118. For example, the server 106 works with the visual similarity agent 404 in the curation assistant 402 to determine similarity. Visual similarity results may not be the same as the similar files that were determined based on file signature or has signature. For example, visual similarity results may return media files that are visually similar in the sense that the backdrops are the same, despite the active content in the media files are vastly different (Le., person A standing with person B at location X in media file 1, and person C standing with person B at location X in media file 2).

If the visual similarity agent 404 determines that the media file to be uploaded is similar to one or more media files 120, then the curation assistant 402 accesses the one or more similar files (operation 514). The curation assistant 402 then presents each of the one or more similar files to the user (operation 516). For example, in this embodiment where the curation assistant 402 is executing on the server 106 or in another embodiment where the curation assistant 402 is executing remotely on a cloud separate from both the server 106 and the client device 102, the curation assistant 402 transmits the one or more similar media files to the client device 102. The user 101 may be presented with each of the one or more similar media files through a web application on the client device 102. In another embodiment, such as that where the curation assistant 402 is executing on the client device 102, the curation assistant 402 requests the one or more similar media files from the server 106 and presents the files to the user 101.

Along with presenting the one or more similar media files to the user 101, the curation assistant 402 may also suggest a gallery to which the media file will be uploaded (operation 518). For example, the curation assistant 402 may determine that media file 1, media file 2, and media file 3 are similar to the media file to be uploaded. Media files 1 and 2 may belong to gallery A, and media file 3 may belong to gallery B. As such, the curation assistant 402 may suggest uploading the media file to be uploaded to either gallery A or gallery B. The curation assistant 402 then receives instructions from the user regarding uploading of the media file (operation 520). For example, the user 101 may instruct the curation assistant 402 to add media file to gallery A, gallery B, create a new gallery for the media file, or plainly upload the media file to the account.

Figure 6:
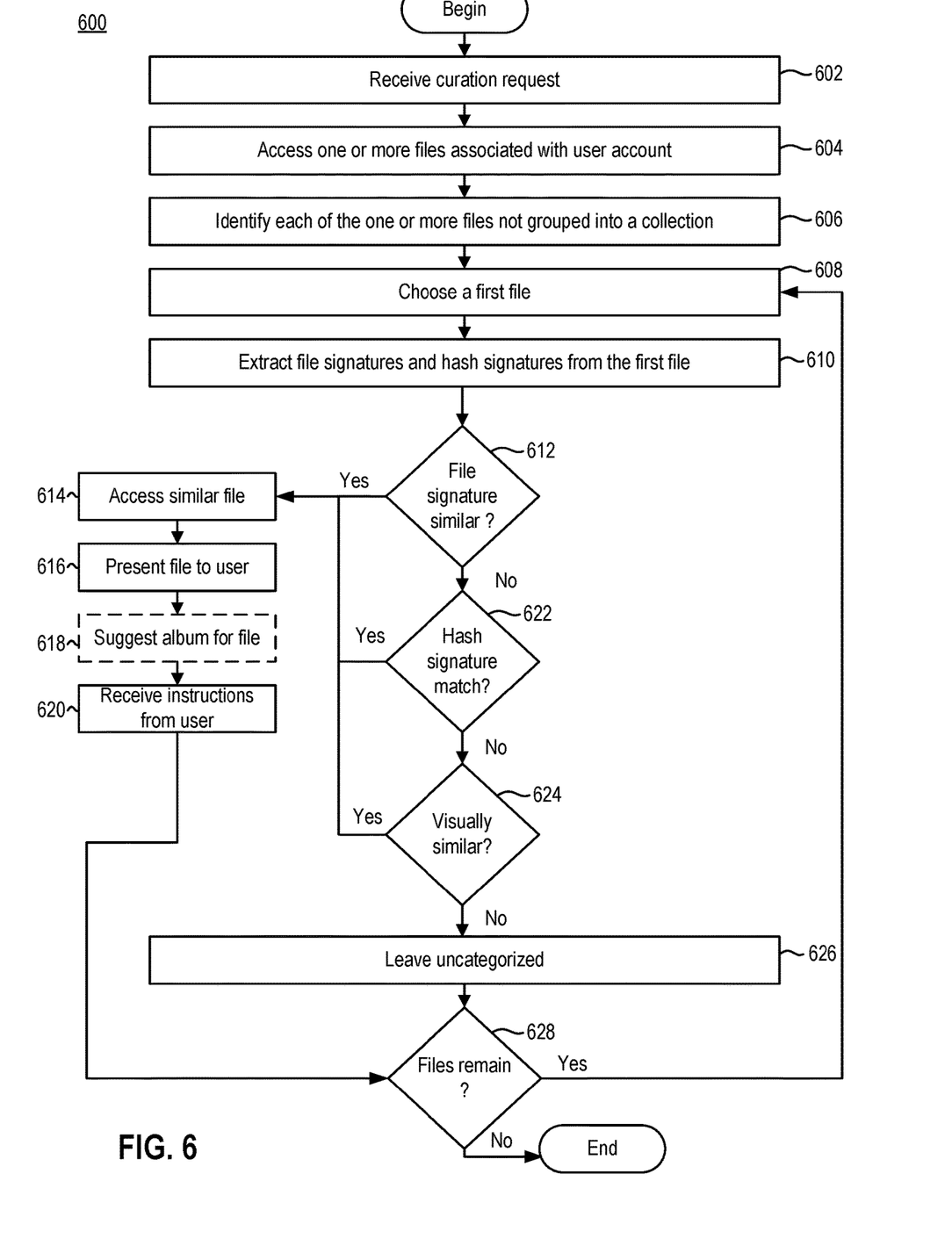
FIG. 6 is a flow diagram illustrating a method of categorizing one or more media files, according to one embodiment.

FIG. 6 is a flow diagram illustrating a method 600 of categorizing a media file, according to one embodiment. The method 600 may be performed after uploading of one or more media files to database 116. The method 600 begins at operation 602. At operation 602, the curation assistant 402 receives a curation request. For example, the user 101 may access a curation assist option on client device 102, prompting the curation assistant 402 to carry out the operations discussed below in conjunction with FIG. 6.

After the user 101 prompts the curation assistant 402, the curation assistant 402 accesses the one or more media files 120 associated with user's account 118 (operation 604). The curation assistant 402 then identifies each of the one or more files that is not grouped into a gallery (operation 606). For example, the curation assistant 402 identifies those media files, which are "loose," i.e., those media files that have not yet been categorized (hereinafter "uncategorized media files"). The curation assistant 402 then chooses a first uncategorized media file for analysis (operation 608). For the first uncategorized media file, the curation assistant extracts the file signatures and hash signatures for the first uncategorized media file (operation 610). Recall, the file signatures 122 and hash signatures 124 for each media file are stored in database 116.

At operation 612, the curation assistant 402 determines whether the file signature of the first uncategorized media file is similar to any file signature in the categorized media files. For example, the curation assistant 402 attempts to categorize the uncategorized media file by finding similar file signatures in the categorized file signatures, and then tracing the similar file signatures back to the galleries to which those media files belong. In one embodiment, operation 612 is optional and the method 600 continues from operation 610 to operation 622.

If the curation assistant 402 determines that there are not similar file signatures, then at operation 622, the curation assistant 402 determines whether the hash signature of the first uncategorized media file is similar to any of the hash signatures of the categorized media files. For example, the curation assistant 402 attempts to categorize the uncategorized media file by finding similar hash signatures in the categorized hash signatures, and then tracing the similar hash signatures back to the galleries to which those media files belong.

If the curation assistant 402 determines that there are not similar media files, then at operation 624, the curation assistant 402 determines whether the first uncategorized media file is visually similar to any of the categorized media files. If the curation assistant determines that there are not any visually similar categorized media files, then at operation 626, the curation assistant 402 leaves the uncategorized media file uncategorized. In some embodiments, the curation assistant 402 may prompt the user to create a new gallery for the uncategorized media file. In other embodiments, the curation assistant 402 may create a default gallery named "Uncategorized Media Files" that contain each uncategorized media file that was checked.

If the curation assistant determines that the answer to decision blocks 612, 622, or 624 is yes, then at operation 614, the curation assistant 402 accesses the one or more similar categorized media files. For example, the curation assistant 402 may transmit a request to the server 106 to allow access to the one or more similar categorized media files. The curation assistant 402 then presents the one or more similar categorized media files to the user (operation 616). For example, the curation assistant 402 may present the one or more similar categorized media files to the user 101 on the user's client device 102.

Along with the one or more similar categorized media files, at operation 618 the curation assistant 402 may suggest a gallery for the media file. For example, based on the determinations in operations 612, 622, 624, the curation assistant 402 may suggest a gallery based on the galleries to which the one or more similar categorized media files belong. At operation 620, the curation assistant 402 receives instructions from user 101 regarding how to categorize the first uncategorized media file. For example, the user 101 may instruct the curation assistant 402 to which gallery the first uncategorized media file belongs. In another example, the user 101 may instruct the curation assistant 402 to create a "New Gallery" and add the first uncategorized media file to the New Gallery.

At operation 628, the curation assistant 402 determines whether there are any uncategorized media files. If there are remaining uncategorized media files, then the method 600 reverts to operation 608 and the curation assistant 402 chooses another uncategorized media file. If there are no remaining uncategorized media files, then the method 600 ends.

Figure 7:
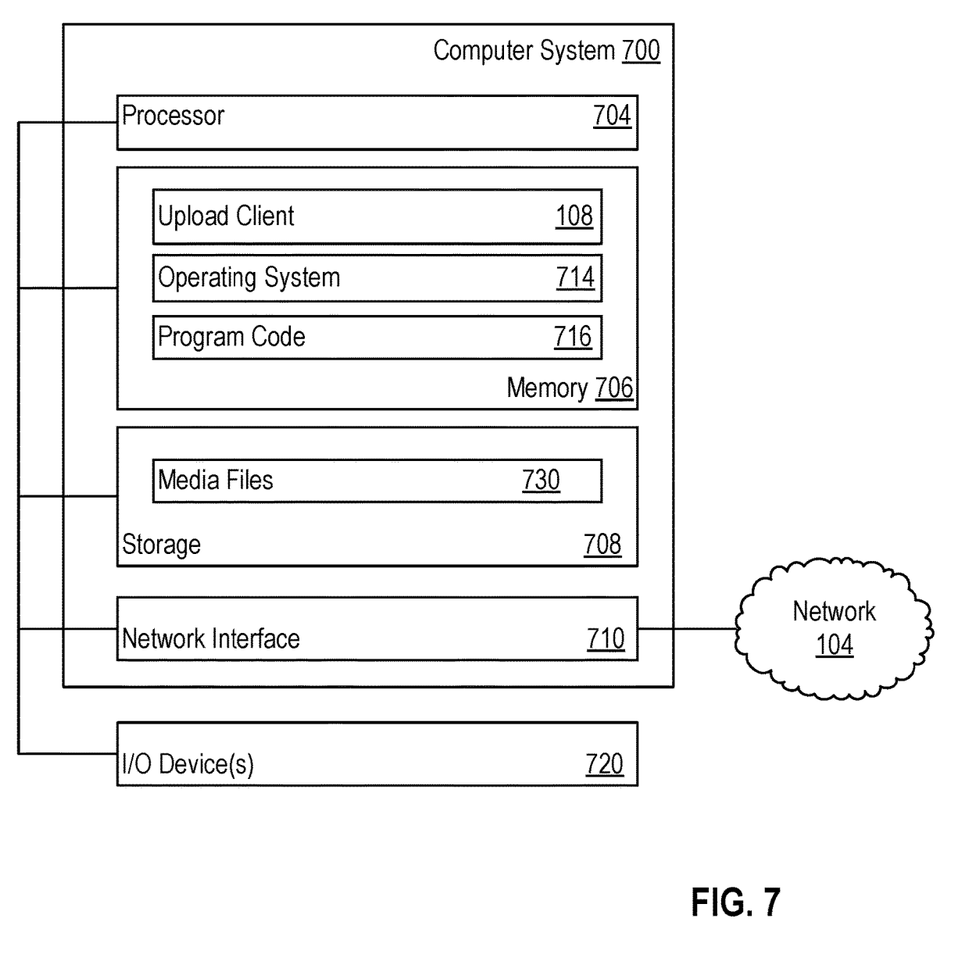
FIG. 7 illustrates a computer system, such as client device from FIG. 1, according to one embodiment.

FIG. 7 illustrates a computer system 700, such as client device 102, according to one embodiment. The computer system 700 includes a processor 704, a memory 706, storage 708, and a network interface 710. The computer system 700 may be coupled to I/O devices 720. The processor 704 may be any processor capable of performing the functions described herein. The computer system 700 may connect to the network 104 using the network interface 710. Furthermore, as will be understood by one of ordinary skill in the art, any computer system capable of performing the functions described herein may be used.

In the embodiment shown in FIG. 7, the memory 706 includes the upload client 108. The upload client 108 may be an application or program run on the computer system 700. In another embodiment, the upload client 108 may be an application installed on a server and accessible to the client via the computer system 700. The upload client 108 may be accessible when a user is logged into his or her account and chooses to upload files into a new or existing gallery. The upload client 108 enables the client to select one or more media files 730 stored in storage 708 that are locally available to the computer system 700 on which the application is executing for upload according to a variety of techniques.

In the pictured embodiment, the memory 706 contains an operating system 714 and program code 716. Although memory 706 is shown as a single entity, memory 706 may include one or more memory devices having blocks of memory associated with physical addresses, such as random access memory (RAM), read only memory (ROM), flash memory, or other types of volatile and/or non-volatile memory. The program code 716 is configured to carry out the method for uploading a media file and organizing one or more media files, in conjunction with FIGS. 2, 3, and 5, 6, respectively. The memory 706 is an example of tangible media configured to store data, such as trace data, APIs invoked, and the like. Other types of tangible media include floppy disks, removable hard drives, optical storage media, such as CD-ROMs and DVDs, bar codes, and the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present example also relates to an apparatus for performing the operations herein. This apparatus may be specially constructed for the illustrated purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The structure for a variety of these systems will appear from the description above. In addition, the present examples are not described with reference to any particular programming language, and various examples may thus be implemented using a variety of programming languages.

As described in greater detail herein, embodiments of the disclosure provide a software application through which a user may access a first file storage location, such as a personal web page hosted by a server, on a remote device by a link accessed via a second graphical user interface. The user may upload and/or transfer media files from a second file storage location accessed via the second graphical user interface to the first file storage location. The link may allow a user to send a link via a data network that will allow the user to quickly log in and upload media files from the remote device, which accesses the link. As such, the media files accessible by the remote device may be transferred from the second storage location of the remote device to the first storage location.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (for example, read-only memory devices within a computer such as CD-ROM disks readable by a CD-ROM drive, flash memory, ROM chips or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method for detecting similar files, the method comprising:
    storing a plurality of existing file signatures in memory associated with a server, each of the existing file signatures being uniquely mapped to a corresponding media file;
    receiving a request sent over a communication network from a user device to the server, the request concerning upload of a file to the server; and
    executing instructions stored in memory of the server, wherein the instructions are executed by a processor of the server to:
        generate a file signature for the file based on metadata associated with the file, wherein the file signature is different from a hash signature;
        compare the generated file signature to one or more of the existing file signatures stored in the memory;
        compile a list of one or more potential matches from among the one or more existing file signatures, wherein each of the potential matches is determined to be similar to the generated file signature;
        perform a visual similarity analysis between the requested file and one or more media files associated with the potential matches; and
        generate a curation suggestion for the requested file based on results of the visual similarity analysis, wherein the curation suggestion includes an upload location for the requested file based on respective locations of the media files associated with the potential matches.

2. The method of claim 1, wherein the request is a curation request associated with a plurality of files presented for upload, and wherein the requested file is one of the plurality of presented files associated with the curation request.

3. The method of claim 1, wherein the curation suggestion includes assignment of the requested file to one of a plurality of available web pages.

4. The method of claim 1, further comprising transmitting an authorization to upload the requested file, wherein the authorization is sent to an upload client at the user device.

5. The method of claim 1, further comprising identifying the potential matches by determining that each of the potential matches is within a predetermined deviation from the generated file signature.

6. The method of claim 1, further comprising comparing a hash signature of the requested file to one or more hash signatures of the media files associated with the potential matches.

7. The method of claim 6, wherein identifying that one of the hash signatures of one of the potential matches is similar to the hash signature of the requested file based on the potential match hash signature being within a predetermined deviation from the hash signature of the requested file.

8. The method of claim 1, wherein the visual similarity analysis includes analyzing one or more of backdrops, subjects, locations, and pixels.

9. The method of claim 1, wherein the curation suggestion includes generating a new online media gallery for the requested file.

10. The method of claim 1, wherein the curation suggestion includes a category for the requested file, and further comprising uploading the file in accordance with the category.

11. A system for detecting similar files, the system comprising:
    memory that stores a plurality of existing file signatures, each of the existing file signatures being uniquely mapped to a corresponding media file;
    a communication interface that receives a request sent over a communication network from a user device, the request concerning upload of a file; and
    a processor that executes instructions stored in memory, wherein the processor executes the instructions to:
        generate a file signature for the file based on metadata associated with the file, wherein the file signature is different from a hash signature;
        compare the generated file signature to one or more of the existing file signatures stored in the memory;
        compile a list of one or more potential matches from among the one or more existing file signatures, wherein each of the potential matches is determined to be similar to the generated file signature;
        perform a visual similarity analysis between the requested file and one or more media files associated with the potential matches; and
        generate a curation suggestion for the requested file based on results of the visual similarity analysis, wherein the curation suggestion includes an upload location for the requested file based on respective locations of the media files associated with the potential matches.

12. The system of claim 11, wherein the request is a curation request associated with a plurality of files presented for upload, and wherein the requested file is one of the plurality of presented files associated with the curation request.

13. The system of claim 11, wherein the curation suggestion includes assignment of the requested file to one of a plurality of available web pages.

14. The system of claim 11, wherein the communication interface further transmits an authorization to upload the requested file, wherein the authorization is sent to an upload client at the user device.

15. The system of claim 11, wherein the processor executes further instructions to identify the potential matches by determining that each of the potential matches is within a predetermined deviation from the generated file signature.

16. The system of claim 11, wherein the processor executes further instructions to compare a hash signature of the requested file to one or more hash signatures of the media files associated with the potential matches.

17. The system of claim 16, wherein the processor identifies that one of the hash signatures of one of the potential matches is similar to the hash signature of the requested file based on the potential match hash signature being within a predetermined deviation from the hash signature of the requested file.

18. The system of claim 11, wherein the visual similarity analysis includes analyzing one or more of backdrops, subjects, locations, and pixels.

19. The system of claim 11, wherein the curation suggestion includes generating a new online media gallery for the requested file.

20. The system of claim 11, wherein the curation suggestion includes a category for the requested file, and further comprising uploading the file in accordance with the category.

21. A non-transitory computer-readable storage medium having instructions stored thereon, the instructions executable by a processor, to perform a method of detecting similar files, the method comprising:

storing a plurality of existing file signatures in memory associated with a server, each of the existing file signatures being uniquely mapped to a corresponding media file;

receiving a request sent over a communication network from a user device to the server, the request concerning upload of a file to the server;

generating a file signature for the file based on metadata associated with the file, wherein the file signature is different from a hash signature;

comparing the generated file signature to one or more of the existing file signatures stored in the memory;

compiling a list of one or more potential matches from among the one or more existing file signatures, wherein each of the potential matches is determined to be similar to the generated file signature;

performing a visual similarity analysis between the requested file and one or more media files associated with the potential matches; and generating a curation suggestion for the requested file based on results of the visual similarity analysis, wherein the curation suggestion includes an upload location for the requested file based on respective locations of the media files associated with the potential matches.

* * * * *